(12) United States Patent
Natsume et al.

(10) Patent No.: US 8,562,162 B2
(45) Date of Patent: Oct. 22, 2013

(54) DISPLAY DEVICE AND MANIPULATION DEVICE WITH LIGHT DISPLAY

(75) Inventors: Yoshihiro Natsume, Hamamatsu (JP); Ryuichi Izumi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 615 days.

(21) Appl. No.: 12/410,333

(22) Filed: Mar. 24, 2009

(65) Prior Publication Data
US 2009/0244883 A1 Oct. 1, 2009

(30) Foreign Application Priority Data

Mar. 25, 2008 (JP) ................................. 2008-079376

(51) Int. Cl.
*H04M 1/22* (2006.01)

(52) U.S. Cl.
USPC ................................ 362/86; 362/85; 362/559

(58) Field of Classification Search
USPC ............................................ 362/85–86, 559
See application file for complete search history.

(56) References Cited

U.S. PATENT DOCUMENTS 5,537,300 A * 7/1996 Kraines et al. .................. 362/86

FOREIGN PATENT DOCUMENTS

| JP | 06-083275 A | 3/1994 |
| JP | 09-114390 A | 5/1997 |
| JP | 2002-008907 | 1/2002 |
| JP | 2002-192555 A | 7/2002 |
| JP | 2004-093942 | 3/2004 |
| JP | 2007-134646 | 5/2007 |
| JP | 2007-171705 A | 7/2007 |

OTHER PUBLICATIONS

Notification of Reasons for Rejection mailed May 31, 2012, for JP Patent Application No. 2008-079376, with English Translation, 11 pages.

* cited by examiner

*Primary Examiner* — Jason Moon Han
(74) *Attorney, Agent, or Firm* — Morrison & Foerster LLP

(57) ABSTRACT

A manipulation device has a board and a manipulation panel to cover the board. The board has a printed circuit, a light emitting element mounted on the board for emitting light, a light guide having a incidence part to guide the light incident from the incidence part to a predetermined direction along a surface of the board, and a retention cover to retain the light guide. The retention cover is positioned such that the incidence part of the light guide faces the light emitting element. The retention cover covers a surface of the light guide opposite to the surface of the board. The manipulation panel has a light transmission part formed at a position corresponding to an emission part of the light guide to discharge the light emitted from the light guide to an outside through the light transmission part.

1 Claim, 7 Drawing Sheets

DISPLAY DEVICE AND MANIPULATION DEVICE WITH LIGHT DISPLAY

BACKGROUND OF THE INVENTION

1. Technical Field of the Invention

The present invention relates to a display device having a light emitter supported on a printed wiring board, a display unit for the display device, a retention cover for the display unit, and a manipulation device with a light display having the display device.

2. Description of the Related Art

A mixer to set parameters of electronic musical instruments or sound facilities includes a plurality of faders to set control parameters, such as sound volume, sound quality, and effect, in response to the slide position of manipulators, e.g., knobs, through the sliding movement of the manipulators. At a manipulation panel of the mixer is disposed a light display part including light emitting elements, e.g., light emitting diodes (LED), arranged such that the light emitting elements are adjacent to slide areas of the respective manipulators to display the setting state of the parameters using light. Each of the faders includes a board having electronic parts or circuits to set and transmit parameters. The light emitting elements and a light emission controller are also connected to the board.

A conventional fader, for example a fader disclosed in Patent Reference 1, is constructed in such a structure that a mover coupled to a knob is received in a box-shaped main body, and a board is mounted to the inside surface of a side wall of the main body. Also, a slide manipulation device disclosed in Patent Reference 2 is constructed in such a structure that a board is mounted to a gondola configured to slide in a box-shaped main body.

A device to provide a light display function to a mixer is disclosed, for example, in Patent Reference 3. This device is constructed in such a structure that a board is mounted to the bottom of a manipulation panel of the mixer such that the board is parallel to a fader, and light is discharged from tip ends of LEDs mounted to the board through holes formed in the panel.

[Patent Reference 1] Japanese Patent Application Publication No. 2002-8907 (Paragraph 0013)

[Patent Reference 2] Japanese Patent Application Publication No. 2007-134646 (Paragraph 0042)

[Patent Reference 3] Japanese Patent Publication No. 3716822 (Paragraphs 0014 and 0022)

It is required to arrange faders such that the neighboring faders are adjacent to each other as close as possible to construct the mixer in a compact structure. As a result, a space necessary to mount a light display part decreases, whereby a mounting work is difficult at the time of manufacture, and a lot of labor hours are needed. In the devices disclosed in Patent References 1 and 2, no attention is directed to the mounting of the light display part. In the device disclosed in Patent Reference 3, the LEDs are mounted to the board parallel to the fader as light emitting parts, with the result that a lot of time and labor hours are required to mount the LEDs.

A printed wiring board is characterized in that the printed wiring board itself is constructed in a compact structure. In most cases, therefore, devices using the printed wiring board are required to be constructed in a compact structure. This situation is equally applied to a display device having a light emitter supported on the printed wiring board. Consequently, the above-mentioned problem is common to display devices each of which has the light emitter supported on the printed wiring board.

SUMMARY OF THE INVENTION

Therefore, the present invention has been made in view of the above problems caused by the conventional art, and it is an object of the present invention to provide a display device that allows work of mounting a light display part to be easily and conveniently performed, a display unit for the display device, a retention cover for the display unit, and a manipulation device with a light display having the display device.

(1) In order to accomplish the above objects, the present invention provides a display device comprising: a board having a printed circuit and a mount surface; a light emitting element mounted on the mount surface of the board to emit light away from the mount surface; and a light guide, having an incidence part and being mounted to the board such that the incidence part faces the light emitting element, and having a refection surface for reflecting the light of the light emitting element entered from the incidence part to a direction along the mount surface of the board, thereby discharging the light.

According to this structure, when a plurality of the light emitting elements (light emitters) are mounted to the board, it is preferable to mount surfaces of the light emitting elements opposite to light emission surfaces to the board, and it is possible to obtain a necessary light emitting direction by the corresponding light guides. Consequently, the mounting of the light emitting elements to the board is easily achieved. In particular, it is general to reduce the size of each light emitting element, with the result that it is difficult to accurately decide both the position and the light emitting direction of the small-sized light emitting elements and to mount the light emitting elements to the board. Consequently, the simplified mounting of the light emitting elements according to the present invention is effective in the simplified mounting of the light display device.

Also, the direction in which the light emitted from the light emitting element (light emitter) is away from the surface of the board means an optical axis direction. As far as the optical axis is the direction of the light, there is also included a case in which some of the emitted light, which is diffused, is directed to the surface of the board. The light emitter means a means to discharge light to perform a display using light. In a case where the light emitter is used to display light discharged from a light emitting body, such as a light emitting diode, the light emitter means the light emitting body. In a case where an optical instrument, such as a lens or a reflection body, is used, the light emitter means a light discharge end of the optical instrument. In a case where the light emitter is used to discharge light to a place remote from a light emitting body using a light guide, such as optical fiber, to display the light, the light emitter means a light discharge end of the light guide.

(2) The display device described in Paragraph (1) may be constructed wherein the light emitting element has a light emission surface (top) from which the light is emitted, and a bottom surface (back) opposite to the light emission surface, and the light emitting element is fixed to the surface of the board at the bottom surface of the light emitting element. According to this structure, it is possible to easily mount the back of the light emitting element to the board directly or via another member. Consequently, for example, it is possible to directly mount the back of the light emitting element to the board by soldering, thereby reducing the height of the light emitting element on the board. Also, it is possible to reduce the mounting height of the light guide facing the light emitting element. As a result, it is possible to reduce the total height of the display device including the board.

(3) In order to accomplish the above objects, the present invention also provides a display device comprising: a board having a printed circuit and a mount surface; a light emitting element mounted on the mount surface of the board to emit light away from the mount surface; a light guide, having an incidence part and being mounted to the board such that the incidence part faces the light emitting element, and having a refection surface for reflecting the light of the light emitting element entered from the incidence part to a direction along the mount surface of the board, thereby discharging the light; and a retention cover detachably mounted to the board to retain the light guide, wherein the retention cover is positioned such that the incidence part of the light guide faces the light emitting element while the retention cover is mounted to the board, and the retention cover retains the light guide such that the retention cover covers at least a surface of the light guide opposite to the mount surface of the board.

In this display device, the retention cover covers at least a surface of the light guide opposite to the board to retain the light emitting element, thereby protecting the light guide without disturbing the emission of the light from the end surface of the light guide. Consequently, it is possible to perform mounting work of the light guide to the board while holding the retention cover in hand, thereby achieving the simplicity of the mounting work. Also, the retention cover is detachably mounted to the board, and therefore, it is possible to easily perform maintenance, such as repair, inspection, etc.

(4) In order to accomplish the above objects, the present invention also provides the display device wherein the board includes a terminal part for electrical connection of the printed circuit to an outside, the terminal part protruding in a direction perpendicular to the mount surface of the board, and wherein the retention cover protrudes toward the same side as the terminal part from the mount surface of the board, the retention cover having a protruding height less than that of the terminal part.

The height of the retention cover is restricted as described above, whereby the total height of the board having the display device mounted thereon in the direction perpendicular to the surface of the board is within a predetermined range. Consequently, it is possible to appropriately meet the demand to arrange the board in a compact structure, and faders can be arranged in parallel to one another while the neighboring faders are adjacent to each other.

(5) In order to accomplish the above objects, the present invention also provides the display device wherein the board includes a terminal part for electrical connection of the printed circuit to an outside, the terminal part protruding toward the same side as the retention cover from the mount surface of the board, the terminal part having a protruding height less than that of the retention cover.

Even in this case, the height of the retention cover is restricted, whereby the total height of the board having the display device mounted thereon in the direction perpendicular to the surface of the board is within a predetermined range. Consequently, it is possible to appropriately meet the demand to arrange the board in a compact structure, and faders can be arranged in parallel to one another while the neighboring faders are adjacent to each other.

(6) In order to accomplish the above objects, the present invention also provides a display unit mounted to a board having a printed circuit and a light emitting element, for guiding light emitted from the light emitting element to a predetermined direction relative to a surface of the board, the display unit comprising: a light guide having an incidence part to guide the light to the predetermined direction; and a retention cover to retain the light guide, wherein the retention cover has a locking part to mount the retention cover to the board and a retention part disposed to cover at least a surface of the light guide opposite to the surface of the board, and wherein the light guide has a reflection surface, the light guide reflecting the light entered from the incidence part at the reflection surface to guide the light to the predetermined direction along the board.

The light guide and the retention cover constitute the display unit as described above. Consequently, it is possible to perform work of mounting display units to the board at one time for each display unit, whereby the work is more easily performed. In particular, when a plurality of light emitting elements and the retention cover constitute a display unit, it is possible to mount these light emitting elements and the retention cover to the board at one time, thereby more simplifying the mounting work.

(7) The display unit described in Paragraph (6) may be constructed wherein the incidence part of the light guide is disposed such as to receive the light emitted way from the surface of the board.

When the display unit is constructed as described above, it is possible to use a board using the display unit constructed in such a structure that the light emitting element is disposed to emit light away from the surface of the board. By such disposition of the light emitting element at the board, it is possible for the proximal end of the light emitting element to be easily brought into contact with the board, and, in addition, it is possible for light emission parts at the respective tip ends of the light emitting elements to be equally spaced from the surface of the board. Also, since light guides are mounted to the board for each display unit, it is possible to arrange the light guides at equal distances from the surface of the board. Consequently, when the light emission end of the light guide is configured to be a light discharge part based on such disposition, it is possible to accurately position the light discharge part through a simple mounting work.

(8) The display unit described in Paragraph (7) may further comprises a plurality of light emitting elements, wherein the light guide is formed in a shape of column capable of transmitting light in correspondence to each of the light emitting elements, the column having a lower end serving as the reflection surface inclined to an axis of the column, the column being constructed such that the light incident upon the column from the incidence part is reflected at the reflection surface, then the light is totally reflected at the side of the column, and is emitted through a top of the column, and wherein the retention cover retains the light guides, and the retention cover has light shielding walls disposed between the light guides adjacent with each other, the retention cover retaining the light guides such that sides of the light guides opposite to the corresponding reflection surfaces are placed to the board while the retention cover is mounted to the board.

When the light guide is formed in the shape of a column, and incident light is totally reflected and then emitted, as described above, it is possible to reduce the attenuation of light, which is advantageous to bright light display. Also, in the light guides retained by the retention cover, light is prevented from leaking between the neighboring light guides by the light shielding wall disposed between the neighboring light guides. Furthermore, in the light guides retained by the retention cover, the side surfaces of the light guides opposite to the corresponding reflection surfaces are directed to the board while the retention cover is mounted to the board. In the same manner as in the case of Paragraph (7), therefore, it is possible to use a board using the display unit constructed in such a structure that the light emitting elements are disposed to emit light away from the surface of the board. Also, it is possible to easily arrange the light emitting elements at equal distances from the surface of the board together with the light guides mounted to the board for each display unit. Consequently, it is possible to accurately position light discharge parts of the light guides through a simple mounting work. Also, the retention cover has a function to prevent light emitted from the light emitting elements from leaking to other unnecessary places.

(9) The display unit described in Paragraph (8) may be constructed wherein the light guides are arranged in parallel to one another, and have a connection part connecting the light guides and extending along a direction in which the light guides are arranged in parallel to one another, and the light guides and the connection part are integrally formed using a resin.

In this case, the assembly of the display unit is obtained by retaining the light guides using the retention cover while holding the light guides coupled to one another by the connection part. Consequently, the assembly of the display unit is easily achieved. Also, since the light guides and the connection part are integrally formed using a resin, it is possible to easily couple the light guides to one another.

(10) In order to accomplish the above objects, the present invention also provides a retention cover to mount a plurality of light guides on a board having a printed circuit and light emitting elements, wherein the retention cover comprises a locking part to mount the retention cover to the board, a retention part to cover at least surfaces of the respective light guides opposite to a surface of the board while the retention cover is mounted to the board, and light shielding walls disposed between the light guides adjacent to each other.

The retention cover retains the light guides, such that the retention cover covers at least surfaces of the respective light guides opposite to the board, by the retention part. Consequently, it is possible for the retention cover to protect the light guides without disturbing the emission of the light from the end surfaces of the light guides. Also, the retention cover has a function to prevent light emitted from the light emitting elements from leaking to other unnecessary places. Furthermore, since the retention cover has the light shielding walls disposed between the neighboring light guides retained by the retention cover, it is possible to prevent light guided to one light guide from leaking to another light guide. In addition, the light guides retained by the retention cover are mounted to the board by the locking part at one time, and therefore, the mounting work is easily performed.

(11) In order to accomplish the above objects, the present invention also provides a manipulation device with a light display, the manipulation device comprising a board and a manipulation panel to cover the board, wherein the board has a printed circuit, a light emitting element mounted on the board for emitting light, a light guide having a incidence part to guide the light incident from the incidence part to a predetermined direction relative to a surface of the board, and a retention cover to retain the light guide, the retention cover being mounted to the board, the retention cover being positioned such that the incidence part of the light guide faces the light emitting element while the retention cover is mounted to the board, the retention cover covering at least a surface of the light guide opposite to the surface of the board, wherein the board includes a terminal part for electrical connection with an outside, the terminal part protruding perpendicularly to the surface of the board, the retention cover protruding toward the same side as the terminal part from the surface of the board, and wherein the manipulation panel has a light transmission part formed at a position corresponding to an emission part of the light guide to discharge the light emitted from the light guide to an outside through the light transmission part.

The manipulation device with the light display includes the construction of the display device as previously described, and the display device is covered by the manipulation panel. In the same manner as the above description, therefore, the simplicity of the assembling work is achieved, and it is possible to accurately position light discharge parts with respect to the manipulation panel.

According to the invention, as described above, it is possible to provide a display device that allows work of mounting a light display part to be easily and conveniently performed and that allows a light discharge part to be accurately positioned with respect to a light transmission part of a manipulation panel, a display unit for the display device, a retention cover for the display unit, and a manipulation device with a light display having the display device.

DETAILED DESCRIPTION OF THE INVENTION

Figure 1:
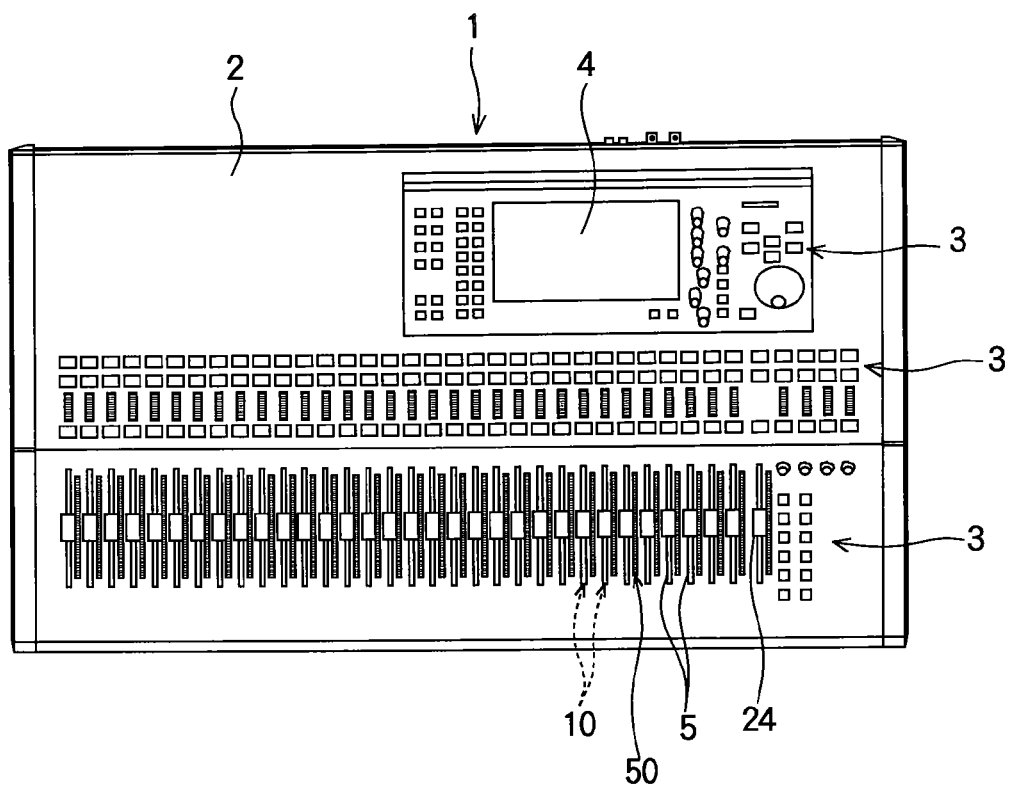
FIG. 1 is a plan view illustrating a slide control console equipped with a display device according to an embodiment of the present invention.

Embodiments of the present invention will now be described in detail with reference to the accompanying drawings. In the drawings, the same or similar elements are denoted by the same reference numerals, and a description thereof will not be given.

Figure 2:
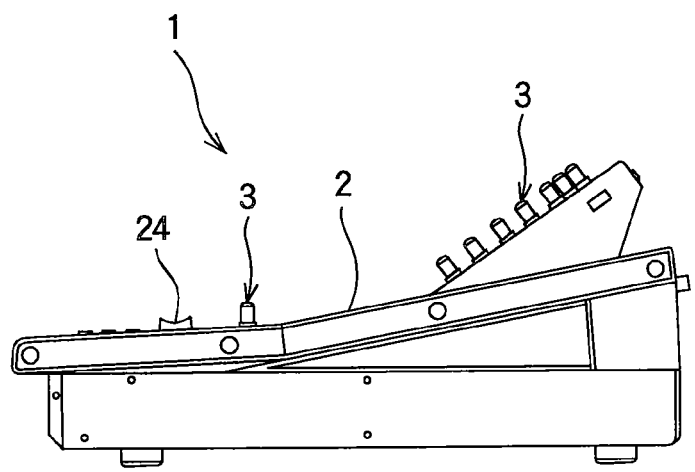
FIG. 2 is a side view of FIG. 1.

FIG. 1 is a plan view illustrating a slide control console equipped with a display device according to an embodiment of the present invention, and FIG. 2 is a side view of FIG. 1. The slide control console 1 is used as a mixer, which is a manipulation device equipped with a light display. As shown in the drawings, a manipulation unit 3 to control various sounds and a monitor 4 are disposed at a panel 2 of the slide control console 1. In addition, a plurality of slits 5 are arranged at the panel 2. At the slide control console 1 are installed slide manipulation devices 10 corresponding to the respective slits 5. Knobs 24 are disposed at the slide control console 1 such that the knobs 24 can slide along the respective slits 5. Also, in this embodiment, displays 50 to perform luminescent display operations corresponding to the positions of the respective knobs 24 are disposed along the respective slits 5.

Figure 3:
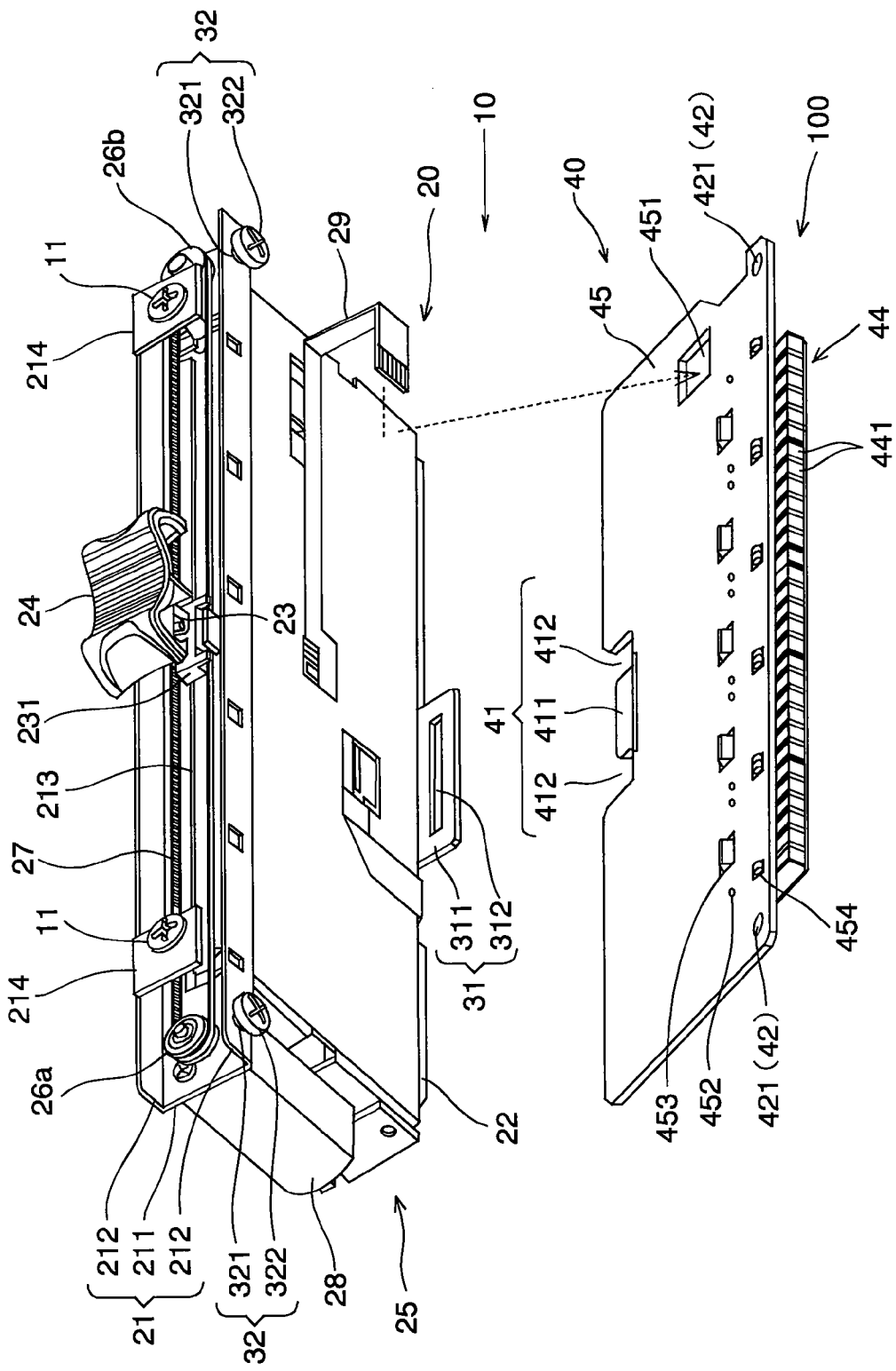
FIG. 3 is a perspective view illustrating a slide manipulation device having the display device, drawn out from FIG. 1.
Figure 4:
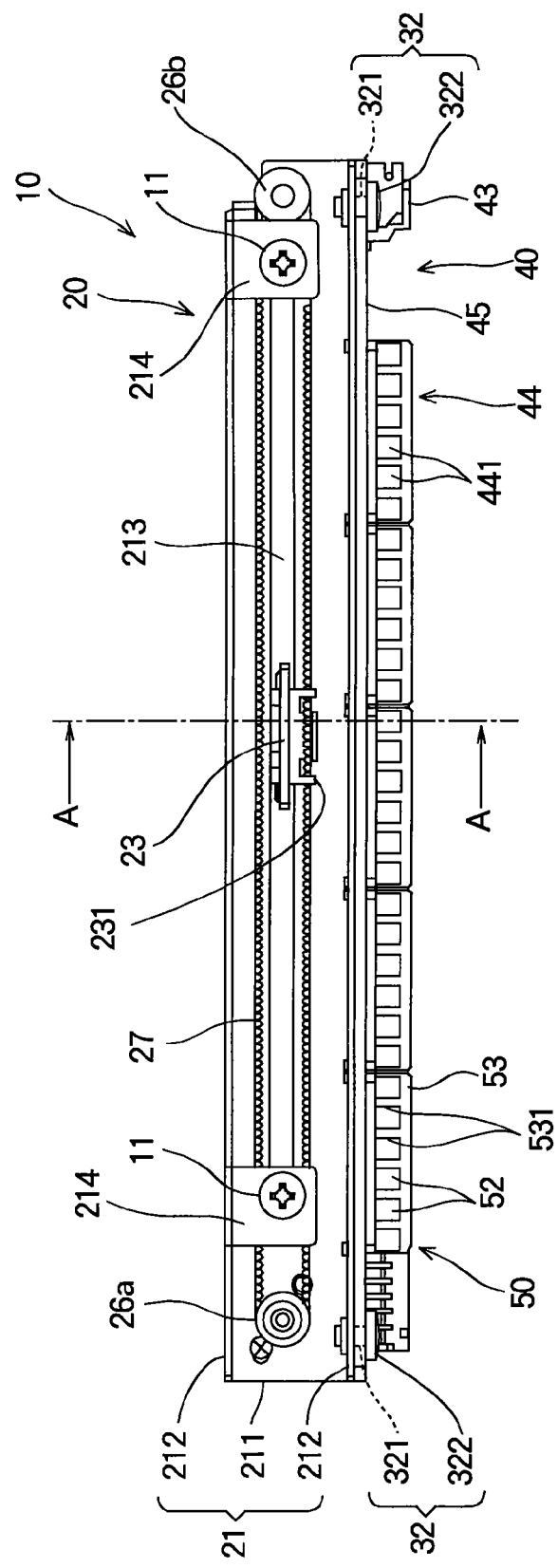
FIG. 4 is a plan view of the slide manipulation device of FIG. 3.
Figure 5:
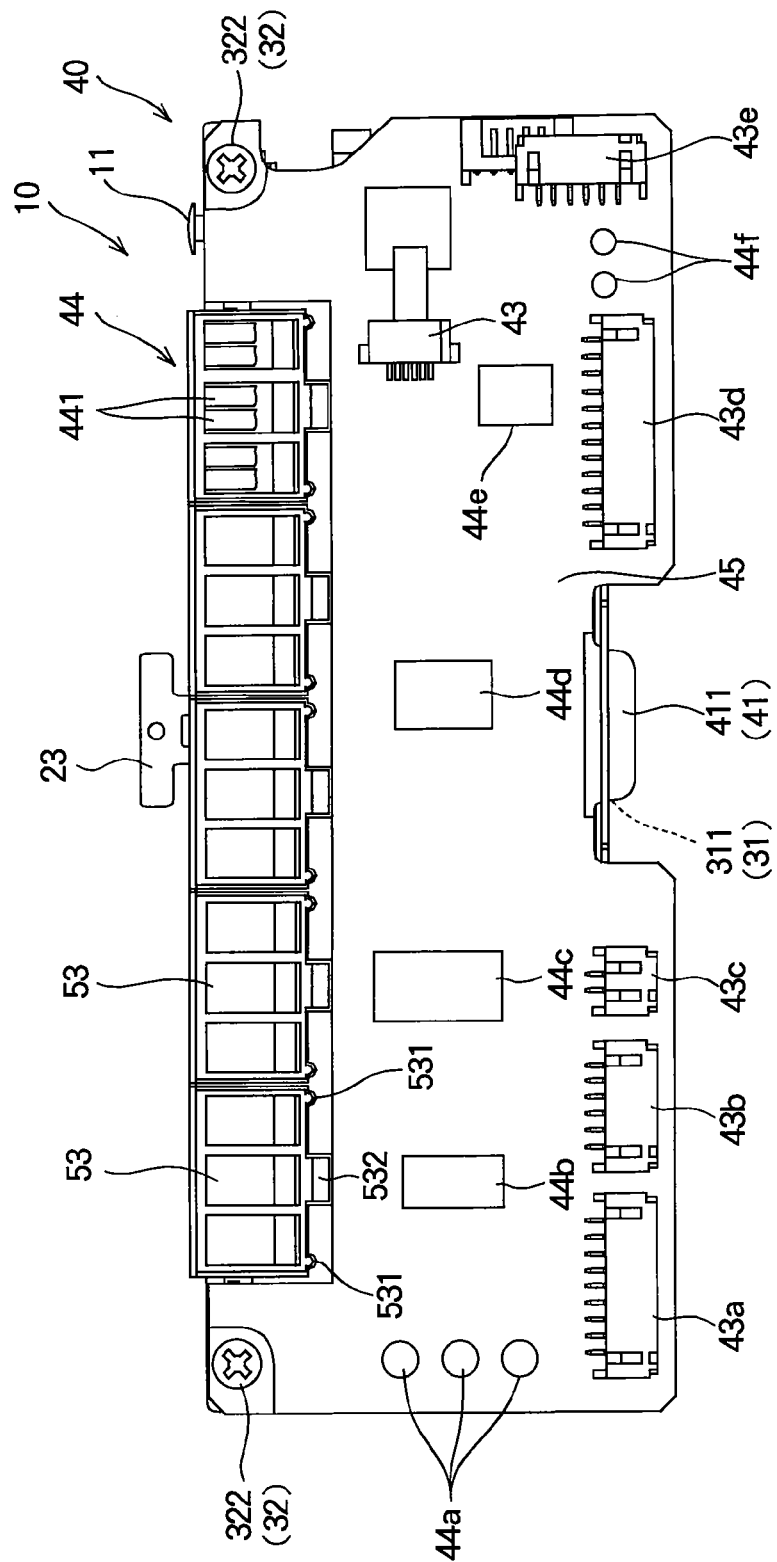
FIG. 5 is a front view of the slide manipulation device of FIG. 3.

FIGS. 3, 4, and 5 are a perspective view, a plan view, and a front view of the slide manipulation device 10, respectively. The slide manipulation device 10 includes a parameter setting part main body 20 configured generally in a flat three-dimensional form and a board 40 having a printed circuit to signalize a parameter and to transmit the signalized parameter. FIG. 3 illustrates a state in which the main body 20 and the board 40 are separated from each other, and FIGS. 4 and 5 illustrate a state in which the main body 20 and the board 40 are coupled to each other. The main body 20 includes a frame 25 having an elongated upper member 21 and lower members 22 extending downward from long sides of the upper member 21. The upper member 21 includes a support wall 211 constituting an upper wall of the frame 25 and erected walls 212 extending upward from opposite sides of the support wall 211. The upper member 21 is formed in a sectional shape of an angulated U. Each of the lower members 22 is formed in a shape of a plate. The lower members 22 constitute side walls located at the sides of the frame 25 together with the erected walls 212. In this embodiment, as shown in the drawings, the frame 25 is configured such that the area of the frame 25 at each side thereof is greater than that of the frame 25 at the top thereof.

In the support wall 211 is formed an elongated opening 213, which extends in the longitudinal direction of the support wall 211. A connection rod 23 protrudes upward through the opening 213. The lower part of the connection rod 23 is coupled to a gondola (not shown) slidably supported in the frame 25. To the upper part of the connection rod 23 is fixed a knob 24. The knob 24 and the connection rod 23 constitute a manipulator to manually manipulate the gondola. At one end of the frame 25 in the longitudinal direction thereof is mounted an electric motor 28. A drive shaft of the electric motor 28 extends upward such that a pulley 26a is fixed to the upper end of the drive shaft of the electric motor 28. Right above the support wall 211, a pulley 26b is rotatably supported at the end opposite to the electric motor 28. On these pulleys 26a and 26b is wound a toothed belt 27. The connection rod 23 is coupled to the toothed belt 27 via a coupling piece 231. Consequently, it is possible for the knob 24 to be slid along the opening 213 along with the gondola. The slide position of the knob 24 is detected by a position sensor disposed in the frame 25. A signal line connected to the position sensor and a signal line to control the driving of the electric motor 28 are drawn out of the frame 25 from the lower member 22 in the form of a flat cable 29. The flat cable 29 is connected to a terminal 43 disposed on a board 40. Consequently, the information of the position of the knob 24 is transmitted to a controller of the board 40 from the position sensor through the flat cable 29. A drive signal from the controller is transmitted to the electric motor 28 through the flat cable 29. As a result, it is possible to slide the knob 24 not only manually but also in a motor-driven manner. The information of the slide position of the knob 24 is transmitted to the controller of the board 40. The controller outputs control parameters, such as sound volume, sound quality, and acoustic effect, in response to the slide position. The output is transmitted to a control device of an electronic musical instrument or a sound facility, which performs sound control according to the control parameters.

At the frame 25 of the main body 20 are disposed a first retention part 31 formed at the outside of the side wall, such that the first retention part 31 protrudes outward from the lower end of the frame 25, by bending a metal sheet or integrally forming a resin and second retention parts 32 formed at the outside of one of the side walls, such that the second retention parts 32 protrude outward from the upper end of the frame 25, by bending a metal sheet or integrally forming a resin. In this embodiment, the first retention part 31 includes a locking plate 311 protruding horizontally from a central part in the longitudinal direction of the frame 25 and an elongated locking hole 312 formed in the locking plate 311. The second retention parts 32 include female-screwed holes 321 formed at opposite ends of one of the erected walls 212 in the longitudinal direction of the erected walls 212 and stop screws 322 threadedly engaged in the respective female-screwed holes 321.

At the board 40 are disposed a first engagement part 41 and second engagement parts 42, which are located at positions corresponding to the respective retention parts. In this embodiment, the board 40 is constructed in such a structure that an electronic part having a printed circuit formed thereon is mounted on a flat support plate 45. The first locking part 41 is disposed at the lower end of the support plate 45. The first engagement part 41 is formed at the central part of the lower end of the support plate 45 in a shape of a tongue-shaped piece 411. Cutouts 412 are formed at positions of the support plate 45 corresponding to opposite sides of the tongue-shaped piece 411. Consequently, the tongue-shaped piece 411 is configured in such a structure that the tongue-shaped piece 411 protrudes downward from the lower ends of the respective cutouts 412. The second engagement parts 42 are formed at opposite ends of the support plate 45 in the longitudinal direction thereof in a shape of a through-hole 421 formed in the upper part of the support plate 45.

In order to couple the main body 20 and the board 40, separated from each other as shown in FIG. 3, to each other such that the main body 20 and the board 40 are coupled to each other as shown in FIGS. 4 and 5, therefore, the tongue-shaped piece 411 of the first engagement part 41 is inserted into the locking hole 311 of the first retention part 31, the support plate 45 is placed near one of the side walls of the main body 20, the through-holes 421 of the second engagement parts 42 are aligned with the female-screwed holes 321 of the second retention parts 32, and the stop screws 322 are threadedly engaged into the female-screwed holes through the through-holes 421 from the support plate 45 side.

At one end of the support plate 45 is formed an opening 451 for wiring. When coupling the main body 20 and the board 40, therefore, it is possible to connect the flat cable 29 to the terminal 43 through the opening 451 for wiring.

Furthermore, a display 50 to display the setting state of parameters by the manipulator is mounted at the board 40. The board 40 and the display 50 constitute a display device 100 having a light emitter (light emitting element) supported on a printed wiring board.

Figure 6:
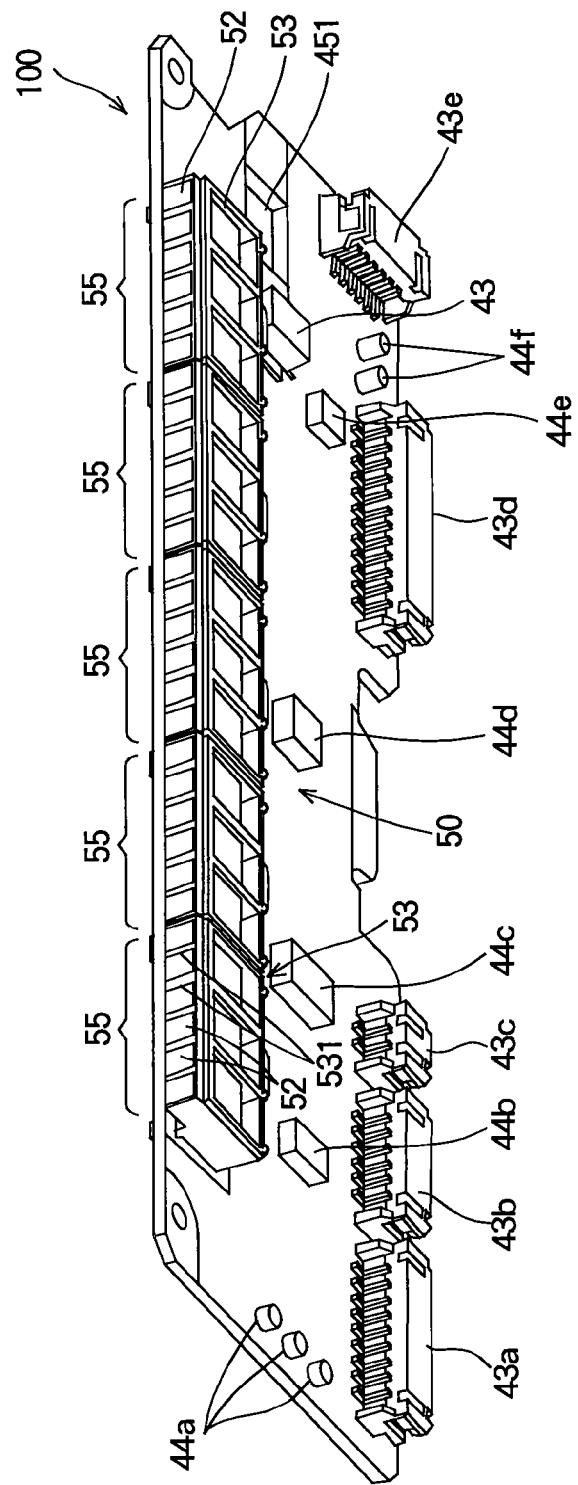
FIG. 6 is a perspective view of the display device in the slide manipulation device of FIG. 3.
Figure 7:
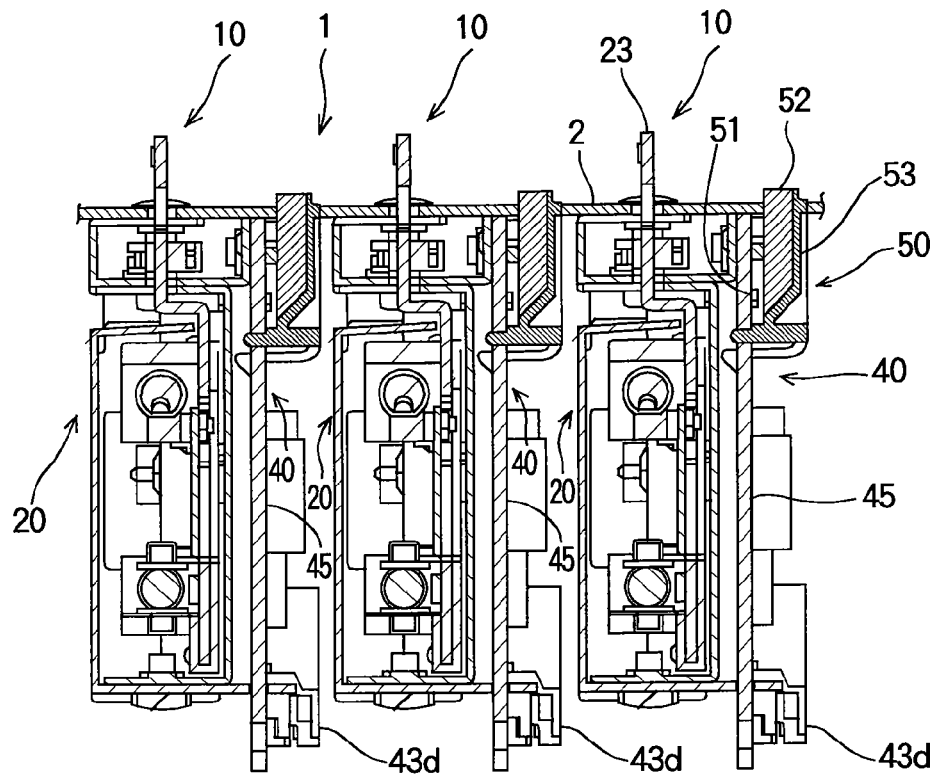
FIG. 7 is a vertical sectional side view illustrating three slide manipulation devices mounted to a panel.
Figure 8:
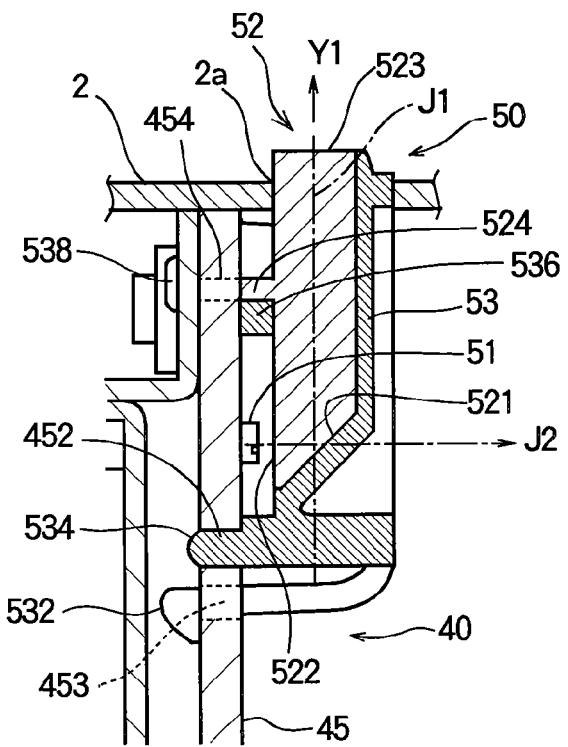
FIG. 8 is a partially enlarged view of FIG. 7, mainly illustrating the display device.

FIG. 6 is a perspective view of the display device 100 when viewed from the side where the display 50 is disposed. FIG. 7 is a vertical sectional side view illustrating a state in which a plurality of the slide manipulation devices 10 are mounted to the panel 2 of the slide control console 1. Also, FIG. 7 is a sectional view taken along line A-A of FIG. 4 (Three slide manipulation devices 10 are illustrated in FIG. 7). FIG. 8 is an enlarged view of FIG. 7, mainly illustrating the display 50.

The display 50 includes light emitting elements 51 mounted to the support plate 45 (the previously-described board) to emit light away from the surface of the support plate 45, light guides 52 to guide the light beams emitted from the corresponding light emitting elements in a direction along the support plate 45 (in the upward direction Y1 of the board width direction), and retention covers 53 to retain the corresponding light guides 52. Each of the light emitting elements 51 is a light emitting diode (LED) on a chip directly mounted to a mount surface of the board. For example, each of the light emitting elements 51 may be constructed in such a structure that the front surface of a rectangular parallelepiped having a dimension of 2×3×2 mm serves as a light emitting part (light emitting surface), the back surface of the rectangular parallelepiped serves as a terminal part. The light emitting elements 51 may be soldered on the substrate by a heating source passing by the board.

Figure 9:
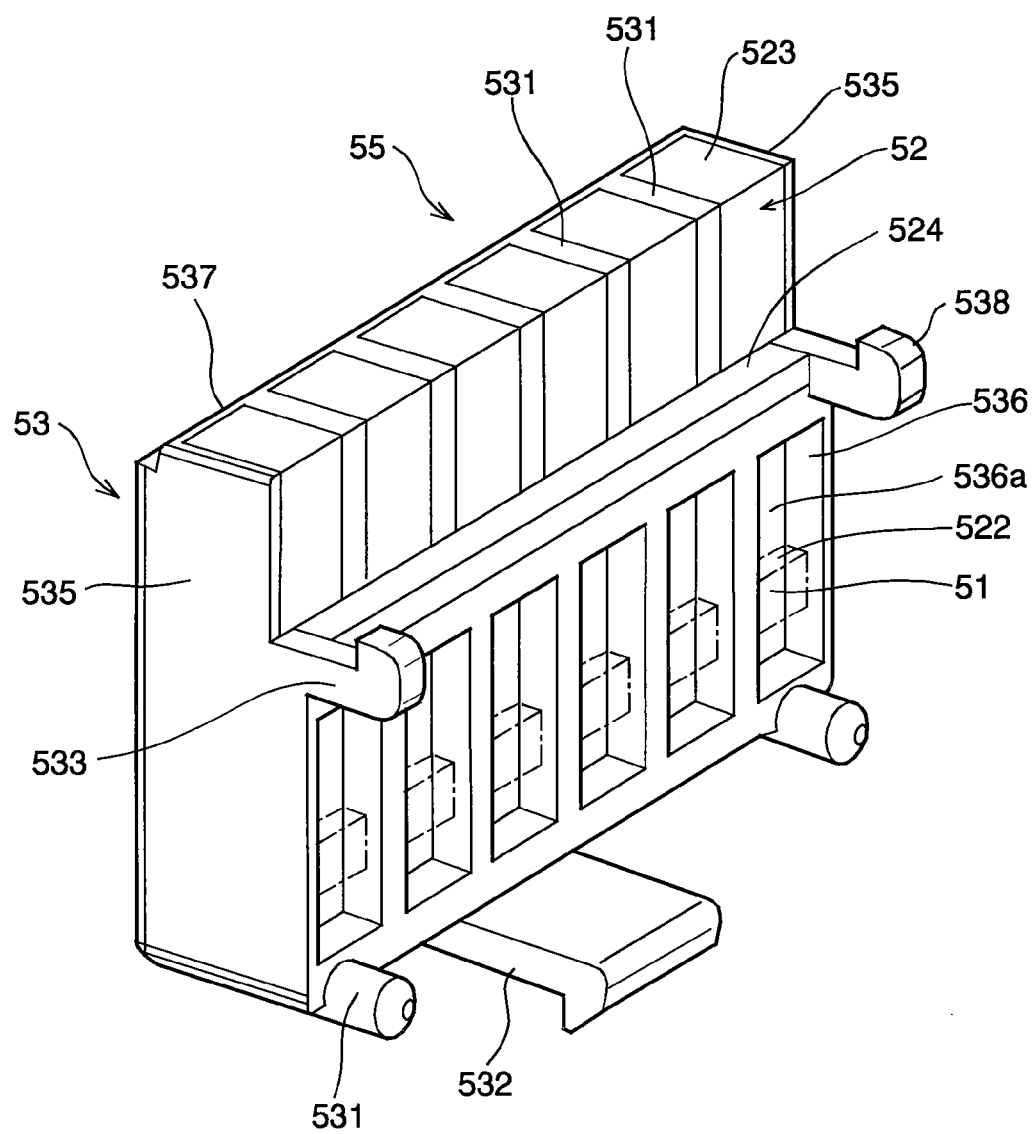
FIG. 9 is a perspective view illustrating an important part of the display device shown in FIG. 8.

As shown in FIG. 9, each of the light guides is formed in a shape of a light transmitting column. A reflection surface 521 is formed at the lower end of the column such that the reflection surface 521 is inclined to an axis J1 of the column, and an incidence surface 522 is formed at the side opposite to the reflection surface 521. The incidence surface 522 is mounted to the support plate 45 such that the incidence surface 522 faces the corresponding light emitting element 51. Light incident upon the light emitting element 51 from the corresponding incidence surface 522 is reflected by the corresponding reflection surface 521, is totally reflected by the side of the column, and are then emitted through the top of the column as an emission surface 523. Consequently, each light guide 52 discharges the light, emitted from the corresponding light emitting element 51 and incident from the corresponding incidence surface 522, to the extension side of the support plate 45 (in the direction of Y1) along the support plate 45. In this embodiment, the light emitting elements 51 emit light in a direction in which an optical axis J2 is perpendicular to the surface of the support plate 45, and therefore, the light guides 52 serve to change an optical path of the incident light by 90 degrees at the reflection surfaces 521.

The light guides 52 are arranged in such a structure that six light guides 52 are arranged parallel to one another such that the light guides 52 face each other in the longitudinal direction, and the light guides 52 are coupled to a connection part 524 extending along the direction in which the light guides 52 are arranged in parallel to one another. The connection part 524 is formed as a runner at the time of integral molding using a resin.

The retention cover 53 is formed in a shape of a box having a side wall 535, a front wall 536, and a back wall 537. The retention cover 53 forms a retention part to enclose the light guides 52. The retention cover 53 includes light shielding walls 531 disposed between the neighboring light guides 52. Each of the light shielding walls 531 prevents light guided to one light guide from leaking to another light guide. At the front wall 536 are formed windows 536a such that the windows 536a are located at positions corresponding to the six light guides 52. While being mounted to the support plate 45, the light emitting parts of the light emitting elements 51 stand face to face with the corresponding windows 536a. The surfaces of the light guides 52 facing the corresponding light emitting elements 51 serve as the incidence surfaces (incidence parts) 522. Also, the upper end of the front wall 536 is disposed at a position where the connection part 524 of the light guides 52 is supported by the upper end of the front wall 536 from below in an illustrated state. The six light guides 532 (light guide assembly) and the retention cover 53 are integrally formed by a two-color molding method, which is a kind of a resin molding method, to constitute a light guide unit. This molding method is disclosed in Japanese Patent No. 3603952. It is possible for the light guide unit to be formed by the two-color molding method. In this case, a light guide function (a function which prevents light emitting intensity from decreasing even when inclining the emitting surfaces of the light guides) of the light guides is remarkably improved.

In the two-color molding method, the light guide part of the light guide unit is formed as a translucency resin part, while the retention cover part of the light guide unit is formed as a light blocking effect resin part.

As resin which forms the translucency resin part, an acrylic (PMMA), polycarbonate, polystyrene (PS), AS (acrylonitrile styrene copolymer), etc. can be used. Also in these, an acrylic (PMMA) with a high light transmittance refractive index and polycarbonate are desirable. In order to make uniform the luminescence, a dispersing agent can also be added to a translucency resin part. However, in order to keep luminosity high, it is desirable to use the dispersing agent which comprises a molecule smaller than the wavelength of the light from a light source. As a dispersing agent, materials usually used are an aluminum oxide, calcium carbonate, etc.

As resin which forms the light blocking effect resin part, ABS, PE, PS, PP, PA, POM, etc. can be used. In these, ABS has a good moldability, and PS has the sufficient dimensional accuracy at the time of shaping.

The following methods can be taken in order to form an air layer between a translucency resin part and a light blocking effect resin part. First, inner one side of two resin parts, a light blocking effect resin part and a translucency resin part, is fabricated (primary shaping). It is advantageous to this to use injection molding from a point of the cost. However, compression molding can also be used. It is desirable to primarily fabricate the light blocking effect resin part from a point of the prevention from welding of the moldability.

Secondary shaping is performed by injection molding about another side of the two resin parts, where the primary molded product is incorporated. That is, by providing in a die the blank which stores a primary molded product, and performing secondary shaping, a secondary die is created and injection molding is performed so that the last gestalt of the light guide unit made of resin may be acquired. In secondary shaping, an injection speed is very important. When the injection speed is low, the primary molded product and the secondary molded product welded, welding is prevented or reduced by making an injection speed conversely higher than the speed at the time of the usual injection molding, and it is found that an air layer required for the total internal reflection in a translucency resin part is formed among both resin. The appropriate value of an injection speed changes with the state of dice such as the length of a runner and a diameter, and gates, kinds, molding temperature of resin.

In this embodiment, the retention cover 53 and the six light guides 52 constitute a display unit 55. The assembly of the display unit 55 is achieved by retaining the light guides 52 using the retention cover 53 while holding the light guides 52 coupled to one another by the connection part 524. Consequently, the assembly of the display unit 55 is easily achieved.

The retention cover 53 is provided at the lower part thereof with positioning protrusions 531 and a mounting hook 532. The retention cover 53 is provided at the upper part thereof with fixing hooks 533. The positioning protrusions 531, the mounting hook 532, and the fixing hooks 533 serve as locking parts. The support plate 45 is provided, at positions corresponding to the positioning protrusions 531, the mounting hook 532, and the fixing hooks 533, with positioning holes 452, a locking hole 453, and fixing holes 454. Consequently, the accurate positioning of the display unit 55 and the fixing of the retention cover 53, retaining the light guides 52, to the support plate 45 are simultaneously achieved by fixing the fixing hooks 533 to the upper part of the support plate 45 through the fixing holes 454, aligning the protrusions 531 with the positioning holes 452, aligning the hook 532 with the locking hole 453, and inserting the protrusions and the hook into the corresponding locking holes. In detail, a tip end 538 of the fixing hook 533 is snapped into the fixing hole 454 using the elasticity of fixing hook 533. Also, it is possible to separate the display unit 55 from the support plate 45 by deforming the hook 532 to release the locked state of the hook 532 and disengaging the deformed hook 532 from the locking hole 453.

In this embodiment, as shown in FIG. 6, the retention cover 53 protrudes from the surface of the support plate 45 at the same side as the terminal 43. In addition to the above-described parts, various kinds of parts are mounted on the board 40. For example, terminals 43*a*, 43*b*, 43*c*, 43*d*, and 43*e*, and electronic parts 44*a*, 44*b*, 44*c*, 44*d*, 44*e*, and 44*f* are mounted on the board 40. The retention cover 53 and the other parts on the support plate 45 have protruding heights less than a protruding height of the terminals (for example, the terminal 43). Consequently, the display device 100 has a total height limited to the sum of the thickness of the support plate 45 and the height of the terminals. When the slide manipulation devices 10 are arranged side by side such that the neighboring slide manipulation devices 10 are adjacent to each other, therefore, it is possible to reduce distance between the neighboring slide manipulation devices 10, thereby constructing the slide control console 1 in a compact structure.

Alternatively, it is also possible to set the protruding heights of the terminals and the other parts on the support plate to be less than the protruding height of the retention cover 53 according to the height of the terminals or the retention cover 53. In this case, the display device 100 has a total height limited to the sum of the thickness of the support plate 45 and the height of the retention cover 53. Consequently, it is possible to reduce distance between the neighboring slide manipulation devices 10, thereby constructing the slide control console 1 in a compact structure.

Each of the slide manipulation devices 10 is mounted to the panel 2 of the slide control console 1 by screws 11 threadedly engaged with brackets 214 extending horizontally from the upper end of the other erected wall 212 of the upper member 21. At the panel 2 are formed light transmission holes 2*a* (FIG. 8) having a light transmission function, which are located at positions corresponding to the emission surfaces 523 of the respective light guides 52. Consequently, light emitted from the light guides 52 is discharged to the outside through the corresponding light transmission holes 2*a*.

At the board 40, the light emitting elements 51 of the respective displays 50 emit light in response to the positions of the knobs 24 of the respective slide manipulation devices 10 based on the information of the positions of the knobs 24. This is typically achieved in a manner in which light is emitted as a bar graph to indicate a range from the bottom to the knobs 24 as shown in FIG. 1. However, other light emitting manners may be used. For example, only a single light emitting element 51 or a plurality of light emitting elements 51 the nearest to the position where each of the knobs 24 is located may emit light.

The present invention is not limited to the above-described embodiments but may be variously modified. For example, the concavo-convex engagement between the first retention part 31 and the second retention parts 32, disposed at the frame 25 of the main body 20, and the first engagement part 41 and the second engagement parts 42, disposed at the board 40, may be reversely designed. Alternatively, it is possible to use other engagement forms for coupling between the first retention part 31 and the first engagement part 41 and between and the second retention parts 32 and the second engagement parts 42. The displays 50 may be configured in various display forms that are capable of emitting light. Also, it is possible to omit the displays 50 when the displays 50 are not needed.

What is claimed is:

1. A display device for mixer comprising:
   a board having a printed circuit and a mount surface inside a control console of the mixer;
   a plurality of light emitting elements each mounted on the mount surface of the board to emit light away from the mount surface;
   a plurality of light guides corresponding to the plurality of light emitting elements, each guide having an incidence part, a discharge part and a reflection surface; and
   a retention cover detachably mounted to the board to retain the light guides such that the incidence part of each light guide faces the corresponding light emitting element and the discharge part of each light guide is located adjacent to an end of the board,
   wherein the discharge part of each light guide constitutes a display parallel to the end of the board,
   wherein each light guide is formed in a shape of a column having at a lower end thereof the reflection surface of the light guide inclined to an axis of the column, and is constructed such that the light incident upon the column from the incidence part of the light guide is reflected at the reflection surface of the light guide, then the light is totally reflected at the side of the column, and is emitted through the discharge part of the light guide formed at a top of the column,
   wherein the light guides are arranged in parallel to one another, and have a connection part connecting the light guides and extending along a direction in which the light guides are arranged in parallel to one another, the connection part being formed integrally with the light guides using a resin,
   wherein the retention cover retains the light guides such that the retention cover covers at least a surface of the light guides opposite to the mount surface of the board,
   wherein the retention cover has light shielding walls disposed between the light guides adjacent with each other,
   wherein the retention cover is formed with a plurality of windows corresponding to the plurality of light guides, so that the light emitted from the light emitting elements enters into the light guides through the corresponding windows, and
   wherein the retention cover supports the plurality of light guides at the connection part thereof above the windows of the retention cover.

\* \* \* \* \*